(12) United States Patent
Klimek et al.

(10) Patent No.: US 7,965,910 B2
(45) Date of Patent: Jun. 21, 2011

(54) BEAM COMBINATION USING INTERLEAVED OPTICAL PLATES

(75) Inventors: Daniel E. Klimek, Lexington, MA (US); Alexander E. Mandl, Brookline, MA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 12/244,510

(22) Filed: Oct. 2, 2008

(65) Prior Publication Data
US 2009/0034084 A1      Feb. 5, 2009

Related U.S. Application Data

(62) Division of application No. 11/461,260, filed on Jul. 31, 2006, now Pat. No. 7,444,044, which is a division of application No. 10/675,650, filed on Sep. 30, 2003, now Pat. No. 7,088,883.

(51) Int. Cl.
*G02B 6/26* (2006.01)
*G02B 6/12* (2006.01)
*G02B 27/10* (2006.01)

(52) U.S. Cl. ............... 385/18; 385/14; 385/52; 359/628

(58) Field of Classification Search .................. 385/14, 385/52; 359/628
See application file for complete search history.

(56) References Cited

U.S. PATENT DOCUMENTS

| | | | |
|---|---|---|---|
| 5,557,475 A | 9/1996 | Nightingale et al. | |
| 5,606,181 A * | 2/1997 | Sakuma et al. | 257/88 |
| 5,636,069 A | 6/1997 | Nightingale et al. | |
| 5,768,453 A | 6/1998 | Gardner | |
| 5,798,877 A | 8/1998 | Nightingale et al. | |
| 5,825,551 A * | 10/1998 | Clarkson et al. | 359/629 |
| 5,877,898 A * | 3/1999 | Hollemann et al. | 359/619 |
| 5,940,554 A | 8/1999 | Chang et al. | |
| 5,986,794 A | 11/1999 | Krause et al. | |
| 6,028,722 A * | 2/2000 | Lang | 359/834 |
| 6,115,185 A * | 9/2000 | Du et al. | 359/628 |
| 6,356,577 B1 * | 3/2002 | Miller | 372/107 |

(Continued)

FOREIGN PATENT DOCUMENTS

DE       19751716       5/1998

(Continued)

OTHER PUBLICATIONS

International Search Report and Written Opinion issued Jan. 2, 2005 in corresponding PCT Application No. PCT/US2004/029473.

(Continued)

*Primary Examiner* — K. Cyrus Kianni
(74) *Attorney, Agent, or Firm* — Mills & Onello, LLP (57) ABSTRACT

In a system and method, the emitted beams of multiple diode bar array assemblies are combined to achieve an increase in the resulting power density in the combined output beam, while addressing the need for heat distribution in each of the individual assemblies. The present invention enables the combination of output planes of illumination, to form a single, merged beam of area $A_g$ having intensity $I_M \sim M^* I_{stack}$ and brightness $B_M \sim M^* B_{stack}$, where $I_{stack}$ and $B_{stack}$ refer respectively to the intensity and brightness of the output plane of illumination of a single stacked array, and where $I_M$ and $B_M$ refer respectively to the intensity and brightness of the combined output plane of illumination of M stacked arrays. In this manner, the present invention is useful in applications where there is a need for high-intensity, high-brightness light energy.

24 Claims, 9 Drawing Sheets

U.S. PATENT DOCUMENTS

| | | | |
|---|---|---|---|
| 6,377,599 B1 * | 4/2002 | Marshall | 372/75 |
| 6,417,944 B1 | 7/2002 | Lahat et al. | |
| 6,417,955 B1 | 7/2002 | Kafka et al. | |
| 6,462,883 B1 | 10/2002 | Wang et al. | |
| 6,600,605 B1 | 7/2003 | Anikitchev | |
| 6,898,222 B2 * | 5/2005 | Hennig et al. | 372/36 |
| 7,088,883 B2 | 8/2006 | Klimek et al. | |
| 7,400,439 B2 * | 7/2008 | Holman | 359/298 |
| 7,444,044 B2 | 10/2008 | Klimek et al. | |
| 2003/0099267 A1 * | 5/2003 | Hennig et al. | 372/36 |
| 2004/0067016 A1 | 4/2004 | Anikitchev et al. | |
| 2004/0252744 A1 * | 12/2004 | Anikitchev et al. | 372/100 |
| 2006/0152931 A1 * | 7/2006 | Holman | 362/297 |
| 2006/0263004 A1 | 11/2006 | Klimek et al. | |

FOREIGN PATENT DOCUMENTS

| | | |
|---|---|---|
| DE | 19751716 A1 * | 5/1998 |
| DE | 19846532 | 10/1998 |
| EP | 1343036 | 9/2003 |
| WO | 0247224 A2 | 6/2002 |
| WO | 2005/033775 A1 | 4/2005 |

OTHER PUBLICATIONS

"Beam Combination Using Interleaved Optical Plates" Specification, Drawings, and Prosecution History, of U.S. Appl. No. 10/675,650, filed Sep. 30, 2003, by Daniel E. Klimek, et al., which is stored in the United States Patent and Trademark Office (USPTO) Image File Wrapper (IFW) system.

"Beam Combination Using Interleaved Optical Plates" Specification, Drawings, and Prosecution History, of U.S. Appl. No. 11/461,260, filed Jul. 31, 2006, by Daniel E. Klimek, et al., which is stored in the United States Patent and Trademark Office (USPTO) Image File Wrapper (IFW) system.

Leibreich, Frank, et al., "Powering Brightness", SPIE's OE magazine, Sep. 2001, pp. 18-19.

Hackel. Lloyd A., DR., "Compact Microchannel-Cooled Laser-Diode Arays Deliver over Tens of kW/cm2 onto the Working Surface", Laser Science and Technology, Mar. 2002.

Hilton, Paul, "Diode Lasers", TWI World Centre for Materials Joining Technology, Feb. 2000, pp. 1-3, TWI Ltd.

Application and prosecution history of U.S. Appl. No. 10/675,650, filed on Sep. 30, 2008, issued as United States Patent No. 7,088,883 B2, on Aug. 8, 2006, By Daniel E. Klimek, et al., entitled "Beam Combination Using Interleaved Optical Plates" which is stored in the United States Patent and Trademark Office (USPTO) Image File Wrapper (IFW) system.

Application and prosecution history of co-pending U.S. Appl. No. 11/461,260, filed on Jul. 31, 2006, by Daniel E. Klimek, et al., entitled "Beam Combination Using Interleaved Optical Plates" which is stored in the United States Patent and Trademark Office (USPTO) Image File Wrapper (IFW) system.

* cited by examiner

BEAM COMBINATION USING INTERLEAVED OPTICAL PLATES

RELATED APPLICATIONS

This application is a divisional of U.S. patent application Ser. No. 11/461,260, filed on Jul. 31, 2006, which is a divisional of U.S. patent application Ser. No. 10/675,650, filed on Sep. 30, 2003, issued as U.S. Pat. No. 7,088,883, the contents of which are herein incorporated by reference in their entirety.

BACKGROUND OF THE INVENTION

Figure 1:
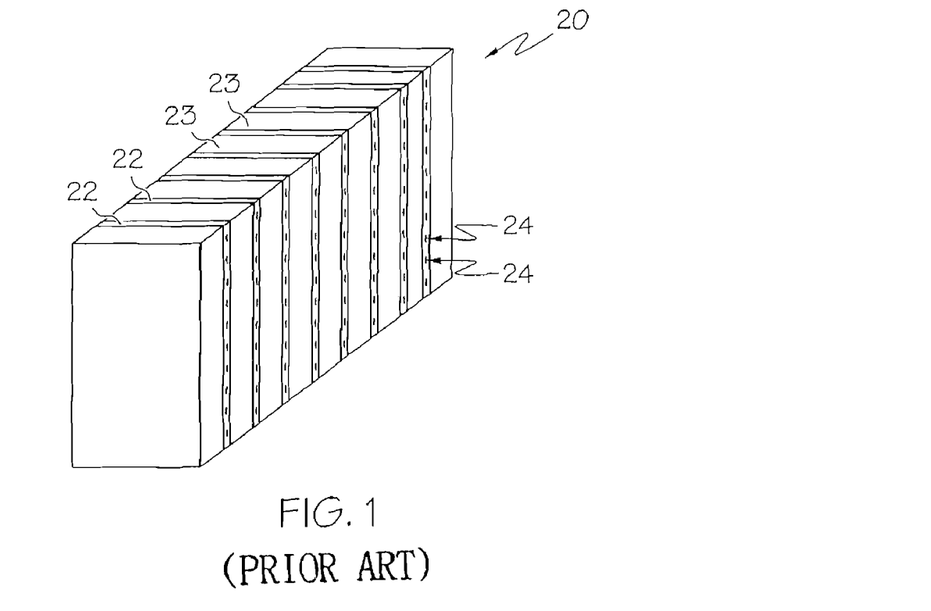
FIG. 1 is a perspective view of a conventional diode laser assembly or stacked array.

Diode laser assemblies are employed in a variety of applications. Such assemblies include multiple diode array "bars" that are configured adjacent each other in an assembly. These assemblies are commonly referred to as stacked arrays. An example of such an assembly is provided in the perspective view of FIG. 1. In the assembly 20, a plurality of diode bars 22 are positioned adjacent each other. Between each bar is a structure 23 which provides a means of support as well as means of heat removal. Each diode emitter 24 in each diode bar 22 emits a nominal amount of power. Collectively, the individual diode emitters 24 and diode bars 22 in the assembly operate to provide a large aggregate power level that is useful for certain applications, including the pumping of larger lasers that require high power input pumping.

Figure 2:
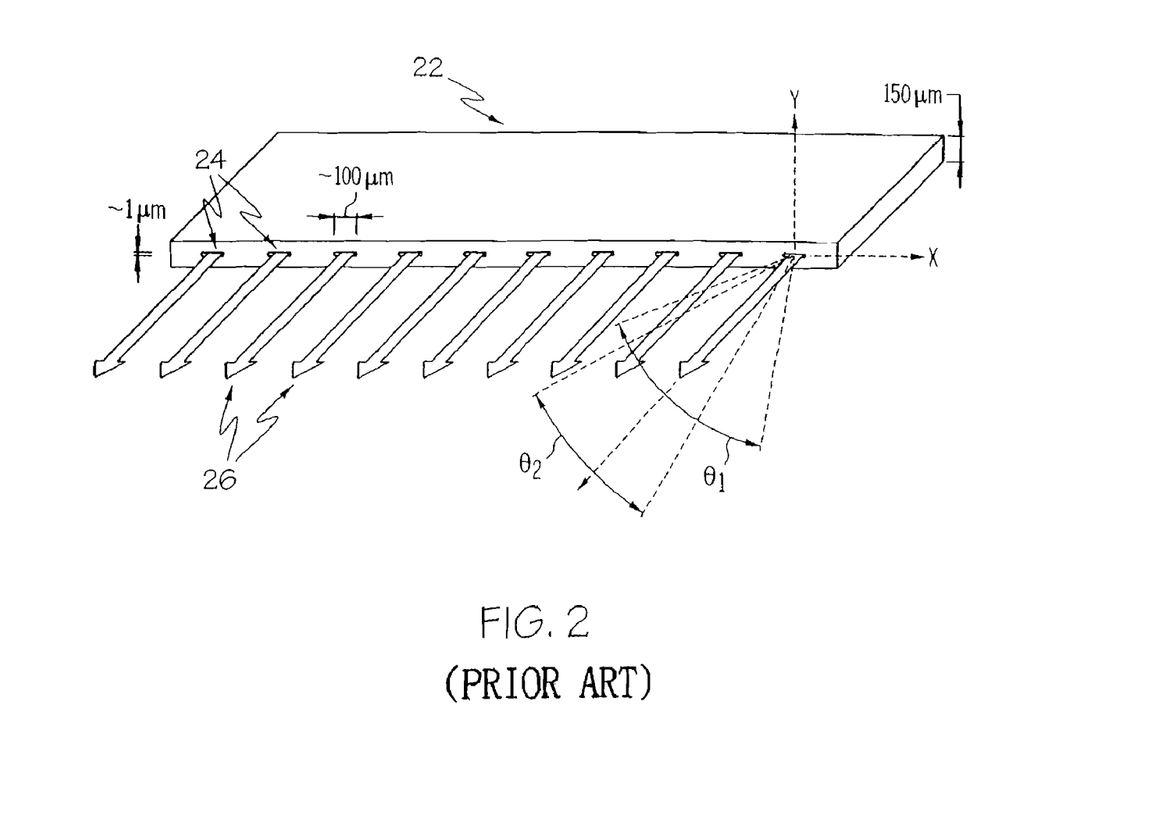
FIG. 2 is a perspective view of a diode bar of the conventional diode laser assembly of FIG. 1.

FIG. 2 is a perspective view of a typical diode bar unit. In this example, the diode bar 22 includes ten diode emitters 24. Each diode bar 22 is, for example, 150 microns wide, but emits an output beam 26 from an emitting surface of each emitter 24 that is only, for example, 1 micron wide and 100 microns long. The beams 26 emanating from the individual diode emitters 24 have a relatively broad angular divergence in one direction or axis and a relatively lesser degree of divergence in the orthogonal direction or axis (often referred to as the "fast" and "slow" axes). This pronounced difference in angular divergence is characteristic of the outputs of edge-emitting laser diodes. For example, in a first orthogonal direction along the x-axis of FIG. 2, the angular divergence $\theta_1$ of the output beam is 10°, and in a second orthogonal direction along the y-axis of FIG. 2, the angular divergence $\theta_2$ of the output beam is 30°. A cylindrical lens is commonly used to collimate the multiple beams emitted by the diode bar, in order to control the divergence in the y-axis direction. For some cases, lenslet arrays can be positioned over the string of emitters to collimate both axes. In conventional embodiments, such lasers are, for example, based on InGaAs on a GaAs substrate, emitting at a wavelength of 940 nm or based on InGaAlAs on a GaAs substrate, emitting at a wavelength of 808 nm.

When a beam 26 emerges from the bar 22, the brightness B (Watts/cm²/ster) of an individual emitted beam is $P_1/(A_e*\Omega)$, where $P_1$ is the power of the individual emitter 24, $\Omega$ is the solid angle of the beam divergence, and $A_e$ is the emitter area. In this example, $\Omega \sim \theta_1*\theta_2*(\pi/180)^2$, and $A_e \sim 1$ micron*100 microns, where the use of "~" herein means "approximately equal to". When emitters are combined in a bar 22, and bars are stacked in an assembly 20, the effective brightness becomes $N*P_1/(A_{stack}*\Omega)$, where N is the total number of emitters in the bar times the number of bars in the array, and $A_{stack}$ is the area of the stacked arrays. The area of the stack is the length of the bar times the separation between bars times the number of bars in the stack. The separation between bars is the width of the bar plus the width of the structure required for support and cooling, and is commonly on the order of 2 mm to 3 mm. The solid angle $\Omega$ of the stack emission is approximately the same as that of the individual emitters. The corresponding average intensity I (Watts/cm²) is $N*P_1/(A_{stack})$.

The brightness of the stack is limited by the space required between emitters in the bar and the space between bars. This space is determined by the requirement to remove waste heat from the emitters. Without proper heat distribution and thermal gradient control, the lifetime of the components are shortened, and the wavelengths of the emitted beams are more likely to vary over time. Currently, in systems that employ continuous wave (CW) diode bars, power densities on the order of 200 W/cm² can be achieved, but this power density is currently limited to this amount, since the diode bars cannot be placed much closer together than 3 mm (assuming a 60 W diode array), due to heat distribution concerns.

In order to achieve higher power density in the output plane, others have resorted to the use of silicon monolithic microchannel laser (SIMM)-based laser arrays. SIMM-based technology improves on the removal of waste heat from the assembly, so that the density of diode emitters, and the proportion of emitting area relative to non-emitting area is increased. Such devices are capable of achieving power densities on the order of 600 W/cm², or about three times higher than that of current diode bar assemblies, and utilize a lens array structure that provides a much lower net divergence of 0.6° along the x-axis and 60 along the y-axis. However, SIMM-based technology is much more expensive, and therefore is limited in practical use.

Others have employed stacks of interleaved optical plates to combine the outputs of two laser assemblies. One example of this is disclosed in Leibriech et al. "Powering Brightness", SPIE OE Magazine, September 2001, pp 18-19. In this example, the output beams of left and right laser diode bars, or "stacks" are coupled into respective parallel plates, each having the height of half the pitch of each stack. The parallel plates interleave the beams, to thereby increase the brightness, and therefore the power density, of the resulting, interleaved output beam. However, this approach requires a collimation lens to transfer the output beams of the laser stacks into each respective plate. Collimation lenses are required because the bar output must enter the plate at an angle thus resulting in a large distance between the bar and the plate at one end of the bar. Without the collimation lens, the large divergence angle of the beam would result in most of the light emitted from the side farthest from the plate missing the entrance face. The angled entrance to the plate is required because this method of interleaving relies on refraction of the beams through the plates to produce the merged output beam. In many applications, the addition of the collimation lenses adds extra complexity and cost. If broad divergence was required, additional lenses would need to be placed at the output of the plates.

SUMMARY OF THE INVENTION

The present invention is directed to a system and method that address the limitations of the conventional approaches. In particular, the present invention provides a system and method in which the beams of multiple diode bar assemblies are combined to achieve an increase in the resulting power density in the combined output beam, while addressing the need for heat distribution in each of the individual assemblies.

The present invention enables the combination of the output planes of illumination, to form a single, merged beam of area $A_g$ having intensity $I_M \sim M*I_{stack}$ and brightness $B_M \sim M*B_{stack}$, where $I_{stack}$ and $B_{stack}$ refer respectively to the intensity and brightness of the output plane of illumination of a single stacked array, and where $I_M$ and $B_M$ refer respectively to the intensity and brightness of the combined output plane of illumination of M stacked arrays.

In this manner, the present invention is useful in applications where there is a need for high-intensity, high-brightness light. This includes, for example, illumination for lighting, observation, photography processing, photo-chemical reactors, photo-curing, photo-aging, photo-exposure, photo pumping of gaseous, liquid and solid media so that they may in turn radiate as sources based on fluorescence, laser action, Raman scattering, or by any other photo emission or photo luminance process. In particular, the systems and method of the present invention are especially applicable to beam combining of the outputs of multiple diode stacked arrays for pumping laser gain media that may be fabricated from grown crystals or as pressed and sintered ceramic laser gain media materials such as Nd:YAG or Yb:YAG crystals or ceramics. The pumped laser may be continuous output, single pulse, or repetitively pulsed, and may be high or low power. The present invention offers special advantages when scaling to high average power, for use in high power lasers that find application in research, metal fabrication, material fabrication including drilling, cutting, surface treating, diagnostics, communication, power transmission, defense systems, and medical applications, to name a few.

In one aspect, the present invention is directed to a system for combining waves of electromagnetic energy. A first transmission plate has an input surface at a first edge and an output surface at a second edge, and a second transmission plate has an input surface at a first edge and an output surface at a second edge. At least one of the first transmission plate and the second transmission plate further includes a reflection discontinuity for reflecting emitted waves that enter the input surface to the output surface.

In another aspect, the present invention is directed to a system for transferring waves of electromagnetic energy. The system includes a first transmission plate having an input surface at a first edge and an output surface at a second edge and a second transmission plate having an input surface at a first edge and an output surface at a second edge. At least one of the first transmission plate and the second transmission plate further includes a reflection discontinuity for reflecting electromagnetic energy that enters the input surface to the output surface, the transmission plates being positioned such that the output surface of the first transmission plate and the output surface of the second transmission plate are co-planar and adjacent.

In one example, the wave of electromagnetic energy comprises a laser beam, for example, of an optical wavelength. The reflection discontinuity comprises, for example, an angled edge surface of the transmission plate, that is treated with a reflective coating. The waves of electromagnetic energy entering the first and second transmission plates may undergo substantial total internal reflection between the input surface and the output surface.

The first and second transmission plates may be bonded together. An optional shim may be included between the first and second transmission plates, in which case, the first and second transmission plates are bonded to the shim.

In an optional embodiment, both of the first and second transmission plates include the reflection discontinuity.

The input surfaces of the first and second transmission plates may be parallel, and receive input electromagnetic energy in the same direction, or in opposite directions. Alternatively, the input surfaces of the first and second transmission plates are at an angle with respect to each other, for example 90°.

In one example, the system comprises a plurality of the first transmission plates and a plurality of the second transmission plates, wherein the plurality of first and second transmission plates are interleaved. The input surfaces of the plurality of first transmission plates may lie along a first input plane and the input surfaces of the second transmission plates may lie along a second input plane, wherein the output surfaces of the plurality of first and second transmission plates lie along a common output plane. The first input plane and second input plane may be coplanar, spaced apart, or at an angle relative to each other. At least one of the first input plane and second input plane may lie at an angle relative to the output plane, or may be parallel to the output plane.

The input surfaces of at least one of the plurality of the first and second transmission plates may be bonded to a common input base plate, and the output surfaces of the first and second transmission plates may be bonded to a common output base plate.

The input surface of at least one of the first and second transmission plates may include an integral lens structure for focusing incident electromagnetic energy to within the transmission plate.

In another aspect, the present invention is directed to a system for combining waves of electromagnetic energy. The system includes a first bar, for example a diode bar, of a first plurality of wave emitters and a second bar of a second plurality of wave emitters. A first transmission plate has an input surface at a first edge and an output surface at a second edge, the input surface of the first transmission plate being substantially parallel to the first bar such that a plurality of first waves emitted by the first plurality of wave emitters enter the input surface in a direction of propagation that is substantially normal to the input surface. A second transmission plate has an input surface at a first edge and an output surface at a second edge, the input surface of the second transmission plate being substantially parallel to the second bar such that a plurality of second waves emitted by the second plurality of wave emitters enter the input surface in a direction of propagation that is substantially normal to the input surface. At least one of the first transmission plate and the second transmission plate further includes a reflection discontinuity for reflecting emitted waves that enter the input surface to the output surface.

The transmission plates may be positioned such that the output surface of the first transmission plate and the output surface of the second transmission plate are co-planar and adjacent. The transmission plates may further be positioned such that output waves provided at the output surface of the first transmission plate and the output surface of the second transmission plate are output in a direction of propagation that is substantially normal to the output surface.

The system may further comprise a plurality of the first bars, a plurality of the second bars, a plurality of the first transmission plates corresponding to the plurality of first bars and a plurality of the second transmission plates corresponding to the plurality of first bars, wherein the plurality of first and second transmission plates are interleaved and positioned with respect to the corresponding pluralities of first and second bars such that the emitted waves of the first plurality of wave emitters and the second plurality of wave emitters are interleaved in an output region comprising the output surfaces of the first and second transmission plates.

The input surfaces of the plurality of first transmission plates may lie along a first input plan, the input surfaces of the second transmission plates lie along a second input plane, and the output surfaces of the plurality of first and second transmission plates lie along a common output plane. The first input plane and second input plane may be coplanar, parallel and spaced apart, or at an angle to each other. At least one of the first input plane and second input plane may lie at an angle relative to the output plane, or may be parallel to the output plane.

The first plate may optionally have a propagation length between the input surface and the output surface that is different from that of the second plate.

In another aspect, the present invention is directed to a system for combining waves of electromagnetic energy. The system includes a plurality of first bars of a first plurality of wave emitters and a plurality of second bars of a second plurality of wave emitters. A plurality of first plates correspond to the plurality of first bars and a plurality of second plates correspond to the plurality of second bars At least one of the plurality of first plates and the plurality of second plates includes a reflection discontinuity for reflecting emitted waves of the wave emitters of the corresponding plurality of first and second bars to an output region. The first and second plates are interleaved and positioned with respect to the corresponding pluralities of first and second bars such that emitted waves of the first plurality of wave emitters and the second plurality of wave emitters of the first and second bars are interleaved in the output region.

In one embodiment, each of the plurality of first plates comprises a first transmission plate having an input surface at a first edge and an output surface at a second edge, the input surfaces of the first transmission plates being substantially parallel to the first bars such that a plurality of first waves emitted by the first plurality of wave emitters of each first bar enter the input surface in a direction of propagation that is substantially normal to the input surface; each of the plurality of second plates comprises a second transmission plate having an input surface at a first edge and an output surface at a second edge, the input surfaces of the second transmission plate being substantially parallel to the second bars such that a plurality of second waves emitted by the second plurality of wave emitters of each second bar enter the input surface in a direction of propagation that is substantially normal to the input surface, In this case, the reflection discontinuity reflects emitted waves that enter the input surface of the respective transmission plate to the output surface.

The transmission plates may be positioned such that the output surfaces of the first transmission plates and the output surfaces of the second transmission plates are co-planar and interleaved. In addition the transmission plates may be positioned such that output waves provided at the output surfaces of the first transmission plates and the output surface of the second transmission plates are output in a direction of propagation that is substantially normal to the output surfaces.—In this case, the waves entering each of the first and second transmission plates preferably undergo total internal reflection between the input surface and the output surface.

The cross-sectional area of the output region is less that a sum of an area of a first input region corresponding to the plurality of first bars and an area of a second input region corresponding to the plurality of second bars. In one example, the cross-sectional area of the output region is approximately equal to the greater of the areas of the first and second input regions.

The reflection discontinuity comprises an angled edge surface of the plate that is optionally treated with a reflective coating. In one example, the plates comprise transmission plates and the reflective coating is inwardly reflective, into the plate. In another example, the plates comprise reflective plates and the reflective coating is outwardly reflective.

In another aspect, the present invention is directed to a method of combining waves of electromagnetic energy. A plurality of first waves are emitted at a plurality of first bars of a first plurality of wave emitters, and a plurality of second waves are emitted at a plurality of second bars of a second plurality of wave emitters. The emitted plurality of first waves and second waves are transferred to an output region using a plurality of first plates corresponding to the plurality of first bars and a plurality of second plates corresponding to the plurality of second bars. At least one of the plurality of first waves and second waves are reflected at a reflection discontinuity. The emitted first and second waves are output as a combined output wave at the output region.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 3:
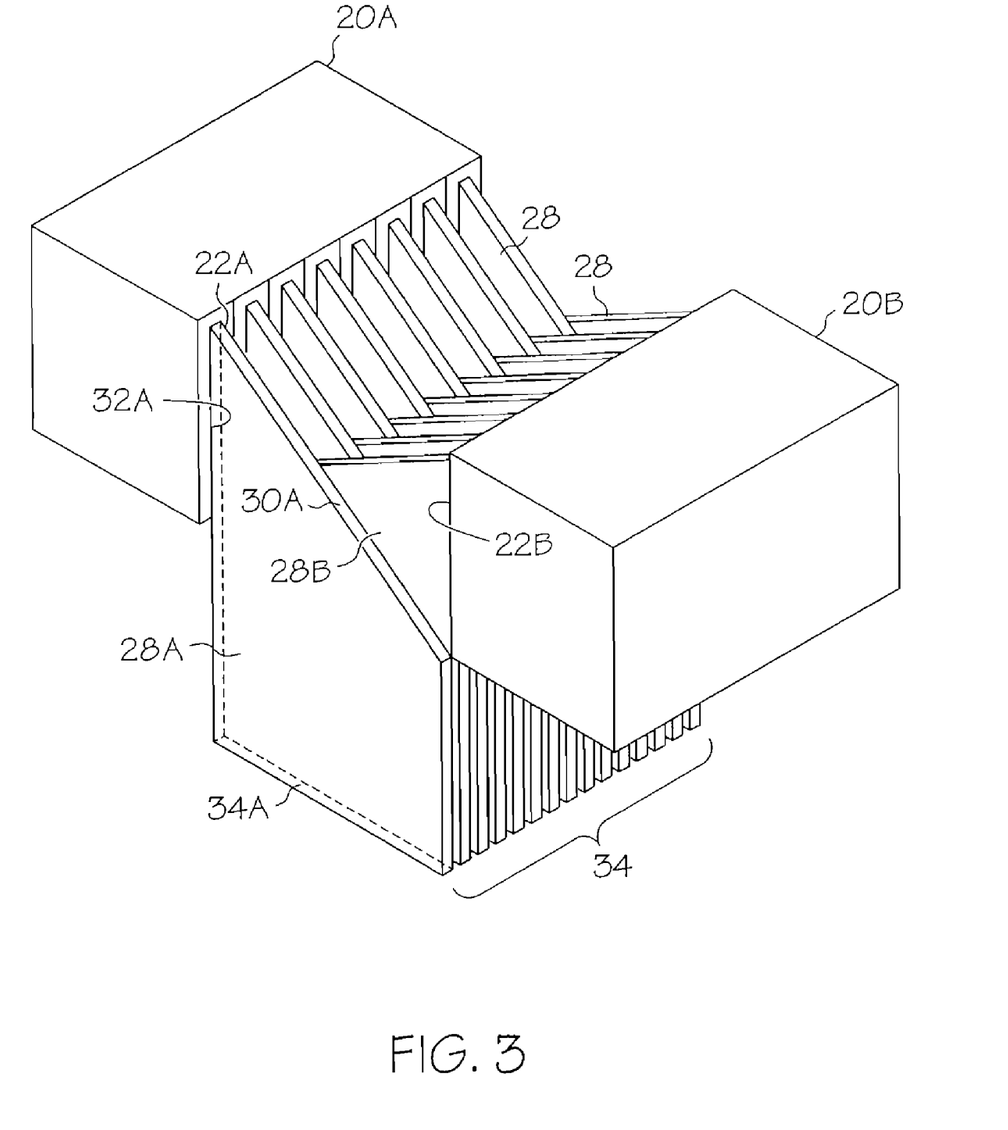
FIG. 3 is a perspective view of a first embodiment of the present invention illustrating the combination of output beams from two diode bar assemblies.

FIG. 3 is a perspective view of a first embodiment of the present invention illustrating a system and method for combining output beams from two wave emitter bar assemblies, such as for example, diode bar assemblies or stacks. Referring to FIG. 3, the system may include first and second diode bar assemblies 20A, 20B. Each diode bar assembly includes a plurality of diode bars 22A, 22B respectively, each diode bar having a plurality of diode emitters, as described above. The diode bars 22A, 22B emit in an outward direction. In this configuration, the diode bars 22A, 22B of each respective diode assembly are opposed in orientation, to face each other, and, accordingly, the respective diode emitters emit output beams in a direction toward each other.

A first set of transmission plates 28A are placed in the path of the beams emitted by the diode bars 22A of the first diode assembly and a second set of transmission plates 28B are placed in the path of the beams emitted by the diode bars 22B of the second diode assembly. The transmission plates 28A, 28B are sufficiently narrow and spaced apart such that when mounted in the assembly they can be interleaved, as shown. Each transmission plate, for example plate 28A, includes an input surface 32A, a reflective surface 30A, and an output surface 34A. Optional antireflection coatings may be applied to input surfaces 32A of the plates to ensure maximum coupling with the diode emission entering the plates. In addition the output surfaces 34A and 34B may be antireflection coated to assure maximum escape of the beam from the plate.

Figure 4A:
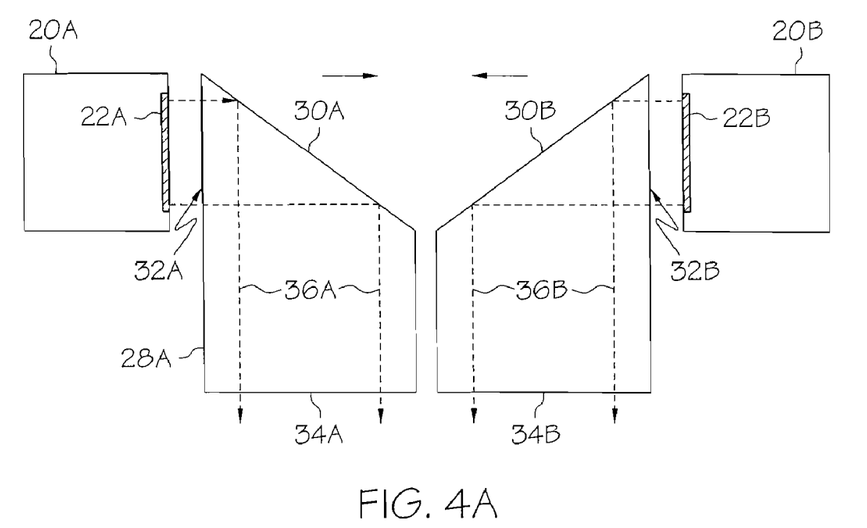
FIGS. 4A and 4B illustrate an exploded side view and an assembled side view of the first embodiment of FIG. 3, in accordance with the present invention.
Figure 4B:
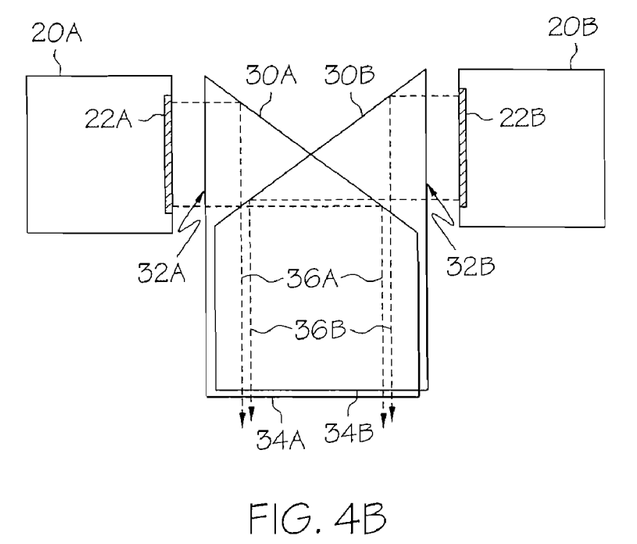

With reference to the exploded and assembled side views of FIGS. 4A and 4B, the output optical beams 36A emitted by a diode bar 22A of the first assembly 20A enter an input surface 32A of the first transmission plate 28A, and are transmitted to a reflective surface 30A. At the reflective surface 30A, the beams 36A are redirected toward the output surface 34A. The beams 36A are thus output at the output surface 34 of the first transmission plate 28A. At the same time, the output optical beams 36B emitted by a diode bar 22B of the second assembly 20B enter an input surface 32B of the second transmission plate 28B, and are transmitted to a reflective surface 30B. At the reflective surface 30B, the beams are redirected toward the output surface 34B. The beams 36B are thus output at the output surface 34B of the second transmission plate 28B.

In this manner, the present invention provides the optical energy emitted by the diode bar 22A of the first diode assembly 20A at the output surface of the first transmission plate 28A and the optical energy emitted by the diode bar 22B of the second diode assembly 20B at the output surface of the adjacent, interleaved, second transmission plate 28B. Because the plates are interleaved and adjacent each other, the combined power density or intensity of the output surface 34 of the dual assembly is approximately double that of the individual power densities of the respective assemblies. Consequently, the resulting effective or apparent brightness at the output surface 34, which is approximately the same surface area as that of a single diode bar assembly or stack is approximately double that of the individual diode bar assemblies.

Further, the output surface 34 of the combined transmission plate assembly 28 lies on a plane that is not parallel to the plane of the respective output surfaces of the diode bar assemblies. This feature offers advantages in applications that require redirection of the orientation of the emitted light, or in applications that have packaging requirements that require such redirection.

In addition, it should be noted that in this configuration, the diode emitters of the respective first and second diode bars of the first and second diode bar stack bar stacks can be of different powers and emit at different wavelengths. Also, the different diode stacks can have different spacings between diode bars, if desired, assuming that the spacings correspond to the positions of the input surfaces of the transmission plates. In this manner, the present invention allows for the combination of waves of different powers and different wavelengths, over a variety of spacing configurations.

An advantage lies in the fact that certain embodiments of the present invention that employ rectilinear and/or flat surfaces do not change the angular distribution of the emitters. Assuming the surfaces of the plates are rectilinear to each other, reflections of the beam off the surfaces, inside the plate, will undergo a change in the sign of the angle, but not in magnitude. The extent to which this preservation of distribution is maintained is dependent on the accuracy to which the plates are aligned with the center axis of the emitted beam and to which the opposing sides are parallel to each other and the input and output faces are perpendicular to the sides. Common output distribution angles of unlensed arrays are 10 and 30 degrees on the slow and fast axes, respectively. This sort of distribution could easily be maintained. The present invention could also be used with lensed arrays where distribution of 0.5 to 4 degrees on the slow and fast axes, respectively, are common. In this case more careful preparation of the plates and more careful alignment would be necessary, but well within common optical practices.

It is possible to alter the angular distribution of the output by changing characteristics of the transmission plate. One approach for reducing the angular distribution in the y-axis is to taper the thickness of the transmission plate so that the thickness is less at the end closest to the diode bar. In the case where the length of the plate 28 is long enough so that there are many bounces of the propagating wave on surfaces forming the thin dimension of the plate 28, then the y-axis angular distribution will be decreased by the ratio of the input thickness to the output thickness.

Another advantage lies in the fact that the embodiments of the present invention do not rely on refraction of the optical beams in transporting the beams from the diode bar assemblies 20A, 20B, to the output surface 34 of the plate assembly 28. Accordingly, it is preferred that the transmission plates are formed of material having a suitable index of refraction, for example 1.6, as can be achieved in materials such as plastic, and glass, for example, so as to ensure total internal reflection of the waves at the reflective surface 30. To ensure reflection at surface 30, the transmission plates 28 may optionally be further coated with a suitable metallic or dielectric coating. The interface at the side wall of the transmission plate can also have an effect on the total internal reflection properties of the plate. Air is a suitable interface, however, a bonding material such as epoxy or glue may also serve as a good interface if its corresponding index of refraction is sufficiently less that that of the plate material for ensuring total internal reflection of the waves within the transmission plate.

When light traveling in one medium is incident with a non-zero angle of incidence on a boundary with a medium of a lower index of refraction, there is a "critical angle", described by Snell's law, at which no refraction occurs and the light is completely retained in the first medium. This occurrence is referred to as "total internal reflection." According to Snell's law, in order to ensure total internal reflection over a large range of angles of incidence, it is desirable for the medium outside of the plate to have as low as index of refraction as possible, i.e., to increase the difference in refractive indices between the two media.

Figure 5A:
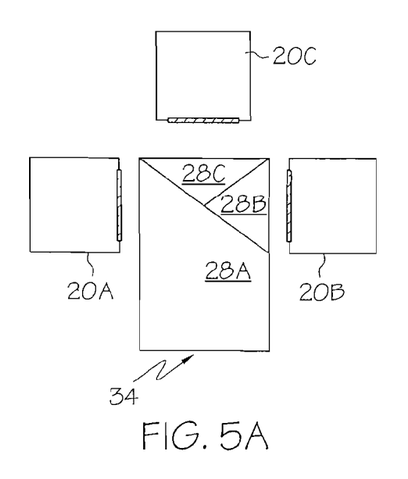
FIG. 5A is a side view of a second embodiment of the present invention illustrating the combination of output beams from three diode bar assemblies.

FIG. 5A is a side view of a second embodiment of the present invention illustrating the combination of output beams from three diode bar assemblies. In this embodiment, first, second and third diode bar assemblies 20A, 20B, 20C are configured at 90° positions relative to each other. Plate 28A transfers the beams emitted by unit 20A to the output surface 34. Plate 28B transfers the beams emitted by unit 20B to the output surface 34. Plate 28C transfers the beams emitted by unit 20C to the output surface 34. The beams being transferred through plates 28A and 28B undergo a reflection, as described above with reference to the embodiment of FIGS. 3 and 4. The beams being transferred through plate 28C do not undergo a reflection, since the source assembly 20C is already oriented in the direction of the output surface. At the output surface, the respective beams of the first, second, and third assemblies are interleaved, as described above.

Figure 5B:
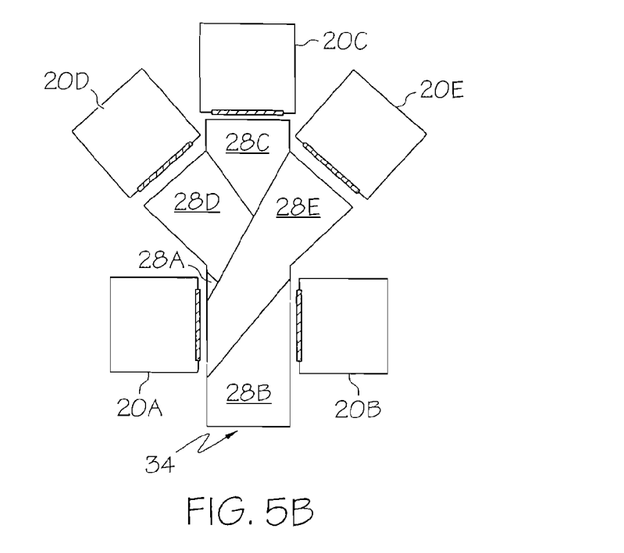
FIG. 5B is a side view of a third embodiment of the present invention illustrating the combination of output beams from five diode bar assemblies.

FIG. 5B is a side view of a third embodiment of the present invention illustrating the combination of output beams from five diode bar assemblies. In this embodiment, the first through third diode assemblies 20A, 20B, 20C and corresponding plates 28A, 28B, 28C are configured in the same manner as that of FIG. 5A. Fourth and fifth laser diode assemblies 20D, 20E are oriented at angles approximately 45° relative to the first, second and third assemblies 20A, 20B, 20C. Accordingly, the geometries of the plates 28D, 28E corresponding to the fourth and fifth assemblies 20D, 20E are configured to provide for a 45° reflection of the emitted beams between the input surfaces and the output surfaces. The first through fifth transmission plates 28A, 28B, 28C, 28D, 28E are interleaved, for example in the manner described above with reference to FIG. 3, and must be sufficiently thin to allow for placement of five interleaved plates per diode bar pitch of the assembly.

Figure 5C:
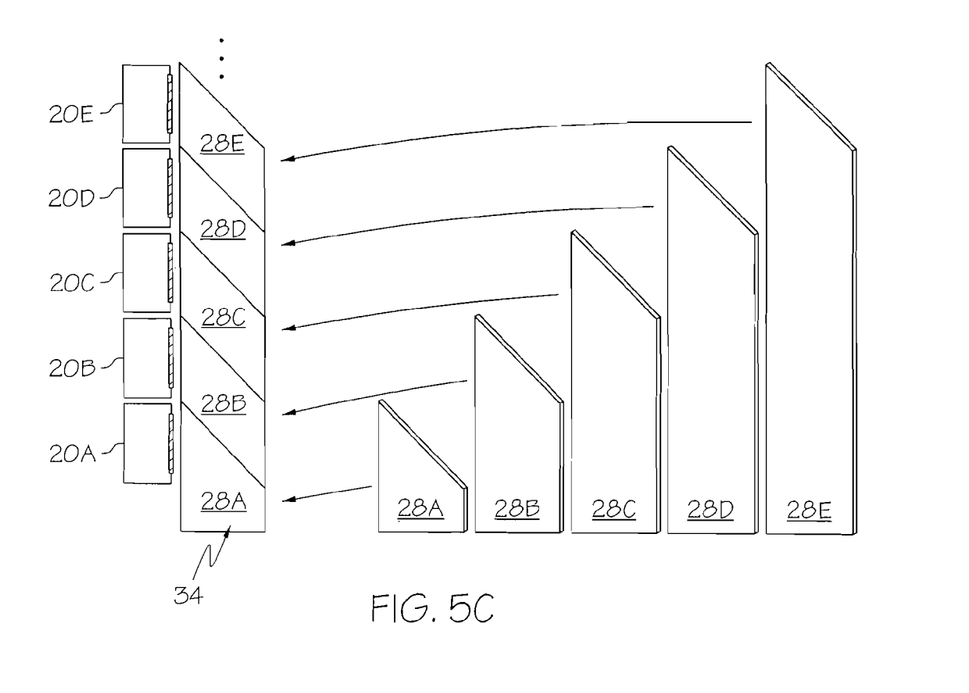
FIG. 5C is a side assembled and exploded view of a fourth embodiment of the present invention illustrating the combination of output beams from five diode bar assemblies.

FIG. 5C is a side view of a fourth embodiment of the present invention illustrating the combination of output beams from five diode bar assemblies. In this embodiment, the diode bar assemblies 20A, 20B, 20C, 20D, 20E are stacked as shown. The corresponding transmission plates 28A, 28B, 28C, 28D, 28E are configured with incrementally larger lengths as shown such that the propagation lengths of the various plates are different, and such that their respective input surfaces are aligned with the corresponding stacked diode bars of the stacked assemblies 20A, 20B, 20C, 20D, 20E. All transmission plates 28A, 28B, 28C, 28D, 28E provide a 90 degree reflection of the emitted beam between the input surface and the output surface. The first through fifth transmission plates 28A, 28B, 28C, 28D, 28E are interleaved, for example in the manner described above with reference to FIG. 3, and must be sufficiently thin to allow for placement of five interleaved plates per diode bar pitch of the assembly. This configuration applies equally well for any number of diode bar assemblies; as few as two and as many as can be reasonably interleaved and coupled into a single output surface.

Figure 6A:
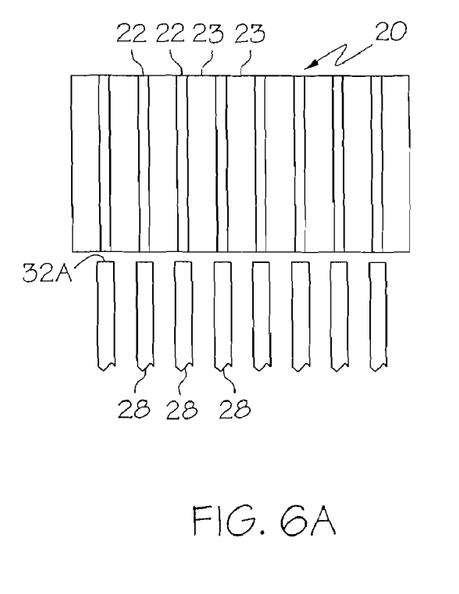
FIGS. 6A and 6B are side views of the interface of the diode bar assembly and the input surface of the transmission plate assembly, in accordance with the present invention.
Figure 6B:
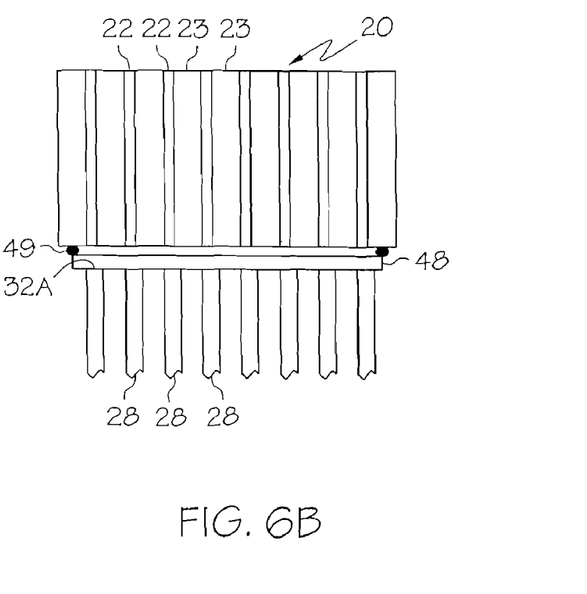

FIGS. 6A and 6B are side views of the interface of the diode bar assembly and the input surface of the transmission plate assembly, in accordance with the present invention. The input surfaces 32A of the plates 28 must be located sufficiently close to the outputs of the emitters 22 to ensure that essentially all of the output wave emission enters the plates 28. In a preferred embodiment, the plates 28 do not touch the output surfaces of the emitters 22, in order to avoid influencing diode performance. The collection of plates 28 are assembled and fixed in position proximal to the diode assemblies 20 by suitable mounting structures. In a similar manner as that described above, second corresponding plates mounted to a second assembly would be interlaced with those of the first assembly.

In the embodiment of FIG. 6B, the input surfaces 28 are coupled to an input base plate 48, for example using a bonding material such as index matching glue. The input base plate 48 is in turn mounted proximal to the output surface of the diode bars 22, for example using cement 49 at the corners of the plate 48. In this embodiment, each transmission plate 28 is aligned and attached to the base plate 48 apart from the assembly 20, and mounted in one joint placement to the assembly. An advantage of this option lies in that only the surface of the base plate 48 facing the emitter diode 22 is antireflection coated, saving the time and cost of individually coating the input faces 32 of each individual plate 28.

Figure 7:
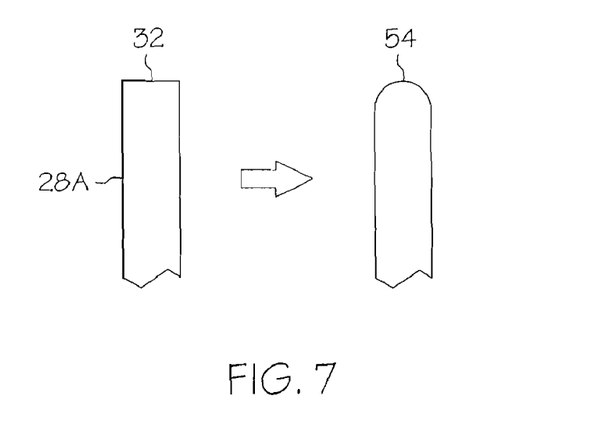
FIG. 7 is a side view of the input surface of a transmission plate that is treated to include an integral lens structure, in accordance with the present invention.

FIG. 7 is a side view of an input surface of a transmission plate 28A that has been treated so as to include an integral cylindrical lens, for coupling light incident thereon into the transmission plate. The lens structure can be formed from the transmission plate material or could be separately fabricated and then attached using a suitable material such as index matched glue. An array of micro-lenses can also be attached to separately collimate each emitter. These lens structures could be either refractive lenses or diffractive lenses. These features operate in a manner similar to cylindrical collimating lenses attached to the stack structure and reduce the angular distribution along the y-axis. This is useful for applications where the input surfaces of the transmission plates 28A are not coupled directly to the diode bar assembly 20 and a reduced angular distribution is desired.

Figure 8A:
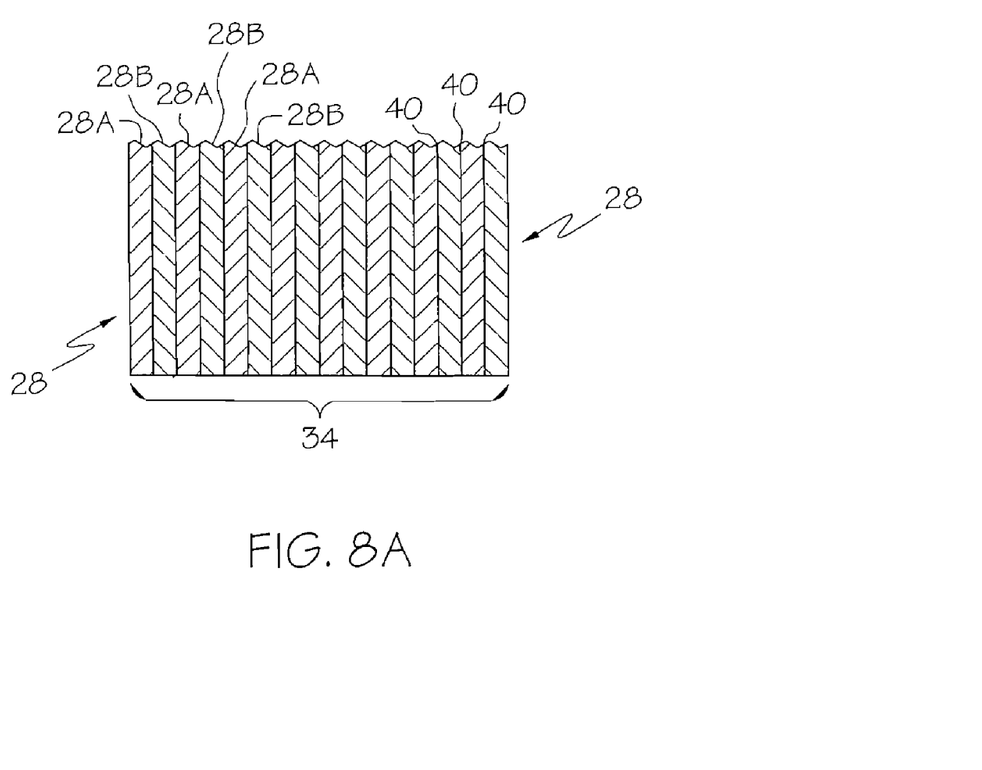
FIGS. 8A and 8B are side views alternative embodiments of the output surface of the transmission plate assembly, in accordance with the present invention.
Figure 8B:
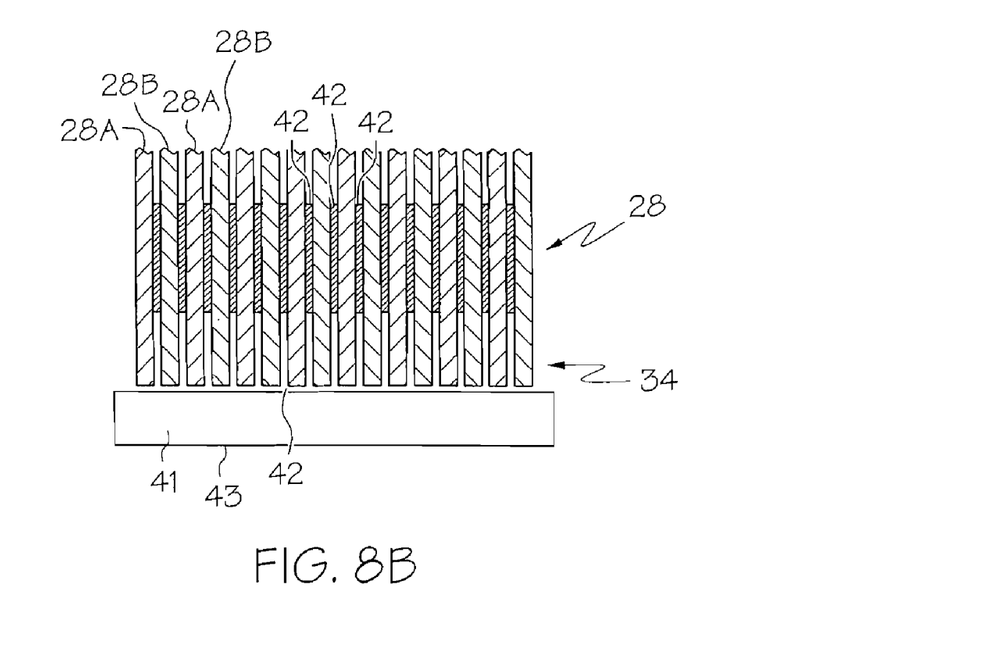

In the plate assembly 28, the transmission plates 28A, 28B may be bonded directly to each other, as shown in FIGS. 8A and 8B, for example prior to mounting the plate assembly next to the output surfaces of the diode bar assemblies. In FIG. 8A, the transmission plates are bonded by cementing adjacent side walls of the interleaved plates 28A, 28B, 28A, 28B . . . , with cement 40. The index of refraction of the cement is less than that of the plate material in order to ensure total internal reflection in the plate. In FIG. 8B, the transmission plates are separated by shims 42 to ensure proper spacing between the plates. In the embodiment of FIG. 8B, adjacent transmission plates 28A, 28B are each bonded to opposite surfaces of a shared shim 42, for example using cement, or they may be held together by a clamping structure external to the collection with no glue between the plates.

As a result, the output surfaces 34 of the transmission plate assemblies 28 of the embodiments of FIGS. 8A and 8B are substantially planar, ensuring a planar redistribution of the light emitted by the planar diode bar assemblies 20A, 20B. In the embodiment, a base plate 40 is bonded 42 to the output surfaces of the transmission plate assembly 28, for example using index matching glue, to ensure a planar output surface for the assembly. As with the input coupling plate 48 as shown in FIG. 6B, the output base plate 41 provides the advantage that only the output surface 43, that is, the surface opposite the plated 28A, 28B, is antireflection coated, and not the individual plate output surfaces. An addition feature of this embodiment, when coupled with other methods of holding firm the position of the plates, such as the attachment of the input plate 48 show in FIG. 6B, and described above, is that the spacing between plates 28 created by the shims 42 can be made clear by removing the shims 42 after the cementing of the input plate 48 and the base plate 41 are complete. This has the advantage of providing a means of cooling the plates, should there be any absorption of the diode beam by the plates, using a flowing fluid such as air or water moving thru the space between the plates 28.

In an alternative embodiment, assuming the transmission blades are formed of a pure material, the blades can be fused together at the output region, such that they lose their individual identities, into a single cross-section of merged blades. This embodiment provides an alternative method to those described above of combining the output surfaces.

Figure 9:
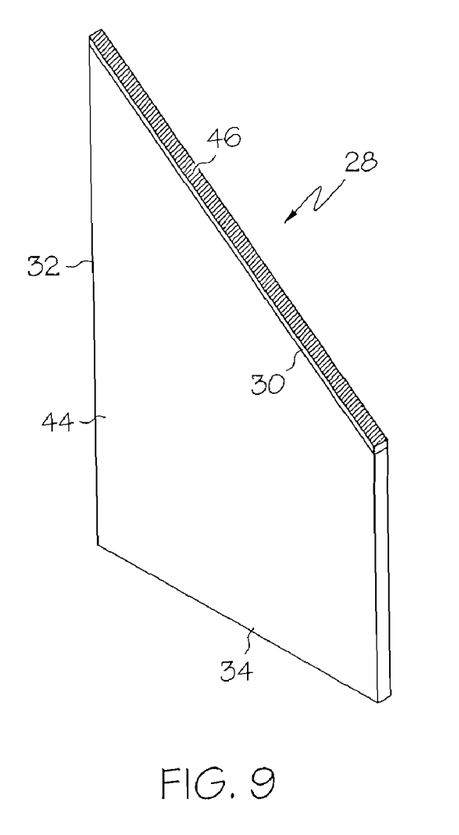
FIG. 9 is a perspective view of a transmission plate, in accordance with the present invention.

FIG. 9 is a perspective view of a transmission plate, in accordance with the present invention. The transmission plate 28 includes an input surface 32, an output surface 34 and a reflection discontinuity 30. In this example, the reflection discontinuity 30 is in the form of an angled edge surface that is treated with a reflective coating 46. The reflective coating 46 may comprise, for example, a metallic coating or a dielectric coating for the wavelength of the diodes and a nominal 45° angle of incidence. As stated above, optional cladding 44 may be applied to the primary surfaces of the transmission plates to ensure complete confinement of the transmitted beams until transmission from the output surface 34. Other forms of reflection discontinuities are possible, for example Graded Refractive Index (GRIN) profiles may be used.

Figure 10:
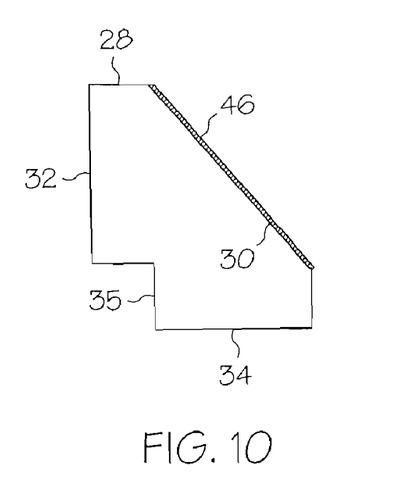
FIG. 10 is a side view of an alternative embodiment of a transmission plate, in accordance with the present invention.

FIG. 10 is a side view of an alternative embodiment of the transmission plate 28 of FIG. 9. In this embodiment, the input surface 32 of the transmission plate 28 extends from the body of the plate 28 such that the input surface 32 is not flush with the left edge 35 of the output surface 34. While this alternative embodiment may be more difficult to manufacture than the trapezoidal transmission plate 28 of the embodiment of FIG. 9, since its shape is more complicated, it may find application in alternative configurations of diode assemblies. Other shapes and configurations of optical plates, whether transmissive and inwardly reflective, as discussed above with respect to the embodiment of FIG. 3, or whether outwardly reflective, as discussed below with respect to the embodiment of FIG. 11, are equally applicable to the principles of the present invention.

Figure 11:
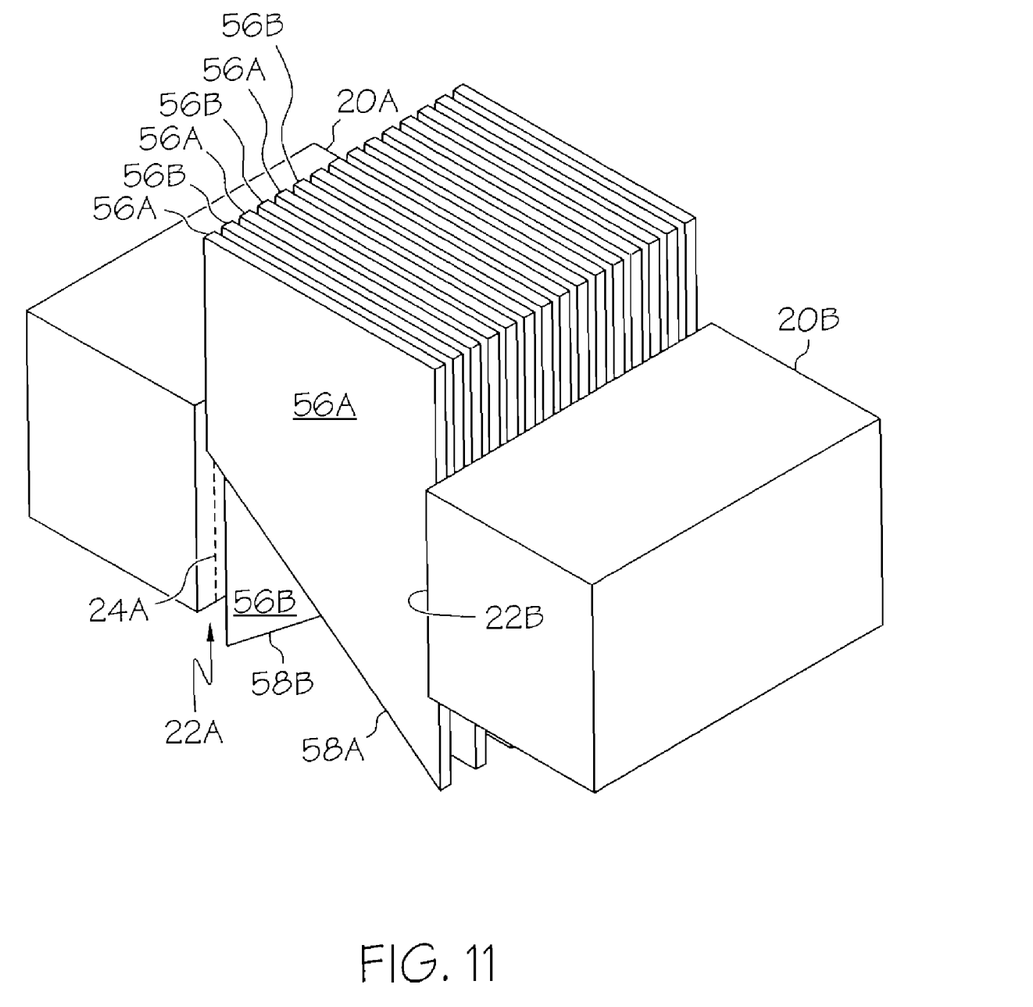
FIG. 11 is a perspective view of a second embodiment of the present invention illustrating the combination of output beams from two diode bar assemblies using an interleaved bank of outwardly reflective plates.

FIG. 11 is a perspective view of an alternative embodiment of the present invention illustrating an alternative system and method for combining output beams from two diode bar assemblies or stacks. In this embodiment, outwardly reflective plates are used to redirect and interleave the output beams of the respective diode bar stacks, rather than the inwardly reflective transmission plates 28 as in the embodiment of FIG. 3.

Referring to FIG. 11, the system includes first and second diode bar assemblies 20A, 20B. Each diode bar assembly includes a plurality of diode bars 22A, 22B respectively, each diode bar having a plurality of diode emitters, as described above. The diode bars 22A, 22B emit in an outward direction. In this configuration, as in the configuration of FIG. 3, the diode bars 22A, 22B of each respective diode assembly are opposed in orientation, to face each other, and, accordingly, the respective diode emitters emit output beams in a direction toward each other.

A first set of reflection plates 56A are placed in the path of the beams emitted by the diode bars 22A of the first diode assembly 20A and a second set of reflection plates 56B are placed in the path of the beams emitted by the diode bars 22B of the second diode assembly 20B. The reflection plates 56A, 56B are sufficiently narrow and spaced apart such that when mounted in the system they can be interleaved, as shown. Each reflection plate, for example plate 56A, includes an outwardly reflective surface 58A. The reflective surface may comprise a treatment of outwardly reflective material that is applied to the angled surface of the reflective plate 56, as described above with reference to the inwardly reflective plate of FIG. 9.

Figure 12A:
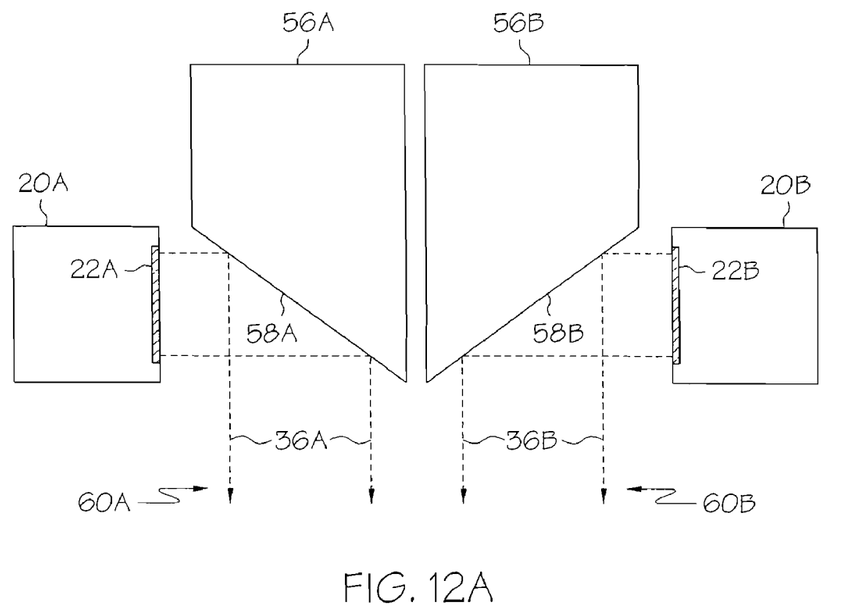
FIGS. 12A and 12B illustrate an exploded side view and an assembled side view of the second embodiment of FIG. 11, in accordance with the present invention.
Figure 12B:
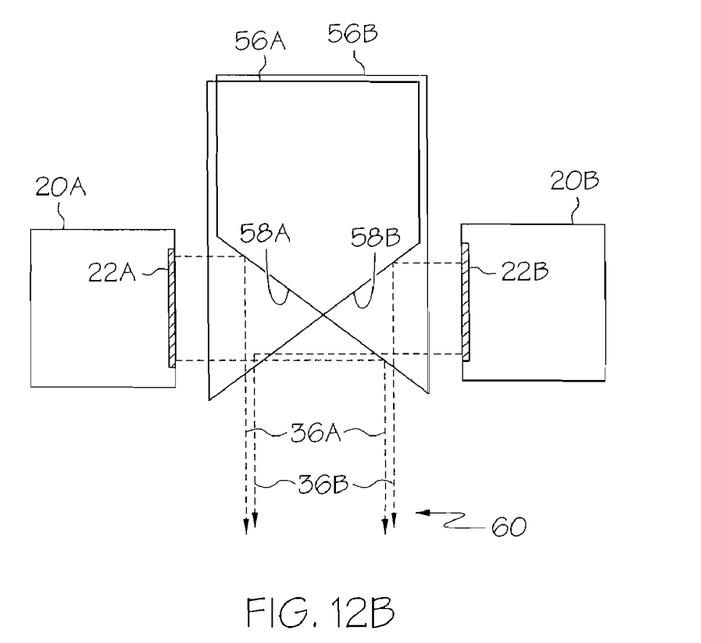

With reference to the exploded and assembled side views of FIGS. 12A and 12B, the output optical beams 36A emitted by a diode bar 22A of the first assembly 20A are incident on the reflective surface 58A of the first plate 56A, at which point the beams 36A are redirected to form an output beam 60A of the system. At the same time, the output optical beams 36B emitted by a diode bar 22B of the second assembly 20B are incident on the reflective surface 58B of the second plate 56B, at which point the beams 36B are redirected to form an output beam 60B of the system.

Since the reflective embodiment of FIGS. 11 and 12 does not confine the emitted waves 36A, 36B to within a waveguide between the diode bars 22A, 22B and the reflective surfaces 58A, 58B, it is preferred, in this embodiment, to employ a lens for collimating and focusing the energy of the emissions 36A, 36B onto the reflective surfaces 58A, 58B. Such collimating lenses are well known in the art of diode bar assemblies. Similar output lenses may be applied for focusing the output wave 60 at the output end of the system, depending on the configuration.

Embodiments of the present invention may include interleaved plates that are exclusively outwardly reflective, as shown in FIGS. 11 and 12, or optionally, may include both outwardly reflective (as in FIG. 11) and inwardly-reflective transmission plates (as in FIG. 3) that are interleaved, depending on the positioning of the diode bar assemblies and depending on the application.

In this manner, the present invention provides the optical energy emitted by the diode bar 22A of the first diode assembly 20A in the output beam 60 and the optical energy emitted by the diode bar 22B of the second diode assembly 20B in the output beam 60 in a manner such that the respective beam emissions 36A, 36B contributing to the output beam 60 are adjacent and interleaved in the output beam 60. As a result, the combined power density or intensity of the output beam is approximately double that of the individual power densities of the respective diode assemblies. At the output surface 34, which is approximately the same surface area as that of a single diode bar or stack, the resulting effective or apparent brightness of the output wave is approximately double that of the individual diode bar assemblies. The optical energy from multiple diode stacks or assemblies can be combined in a similar manner, with a corresponding increase in effective or apparent brightness relative to the area of an individual diode assembly or array.

Further, the output plane of the combined output beam 60 lies on a plane that is not parallel to the plane of the respective output surfaces of the diode bar assemblies. This feature offers advantages in applications that require redirection of the orientation of the emitted light, or in applications that have packaging requirements that require such redirection, as in the transmissive (inwardly reflective) embodiment of FIG. 3 above.

In this manner, the present invention provides a system and method in which the beams of multiple diode bar assemblies are combined in a transmission plate assembly having interleaved transmission plates in order to achieve an increase in the resulting power density in the combined output beam, while addressing the need for heat distribution in each of the individual assemblies. Alternatively, a series of interleaved reflection plates having outwardly reflective surfaces may be employed to accomplish such a combination of beams in a similar manner. An effective increase in brightness in the output beam of the assembly is achieved, by combining the joint output areas of the individual assemblies into the area of the output beam corresponding to one of the diode stacks. In addition, the output beam is transmitted in a plane that is not parallel to the plane of the respective output surfaces of the diode bar assemblies, thereby allowing for redirection of the orientation of the emitted beam in a manner that does not involve refraction of the beam.

While this invention has been particularly shown and described with references to preferred embodiments thereof, it will be understood by those skilled in the art that various changes in form and details may be made herein without departing from the spirit and scope of the invention as defined by the appended claims.

We claim:

1. A method for combining waves of electromagnetic energy comprising:
   outputting a plurality of first waves to a corresponding plurality of first transmission plates, each first transmission plate having an input surface at a first edge at which a corresponding one of the first waves enters the first transmission plate and an output surface at a second edge;
   outputting a plurality of second waves to a corresponding plurality of second transmission plates, each second transmission plate having an input surface at a first edge at which a corresponding one of the second waves enters the second transmission plate and an output surface at a second edge; and
   reflecting at least one of the plurality of first and second waves that enter the input surface of the at least one of the first plurality of transmission plates and the second plurality of transmission plates at a reflection discontinuity of at least one of the first plurality of transmission plates and the second plurality of transmission plates to the output surface of the at least one of first plurality of transmission plates and the second plurality of transmission plates, wherein the input surfaces of the plurality of first transmission plates lie along a first input plane and wherein the input surfaces of the second transmission plates lie along a second input plane, wherein the output surfaces of the plurality of first and second transmission plates lie along a common output plane, and wherein the input surfaces of at least one of the plurality of first and second pluralities of transmission plates include an integral lens structure for focusing incident electromagnetic energy to within the respective first and second pluralities of transmission plates.

2. The method of claim 1 wherein outputting the plurality of first waves comprises outputting the plurality of first waves at a plurality of first bars corresponding to the plurality of first transmission plates, each first bar comprising a first plurality of wave emitters, and wherein outputting the plurality of second waves comprises outputting the plurality of second waves at a plurality of second bars corresponding to the plurality of second transmission plates, each second bar comprising a second plurality of wave emitters.

3. The method of claim 2 further comprising:
   positioning the first transmission plates so that the input surface of each first transmission plate is substantially parallel to one of the first bars such that a plurality of first waves emitted by the first plurality of wave emitters enter the input surface in a direction of propagation that is substantially normal to the input surface; and
   positioning the second transmission plates so that the input surface of each second transmission plate is substantially parallel to one of the second bars such that a plurality of second waves emitted by the second plurality of wave emitters enter the input surface in a direction of propagation that is substantially normal to the input surface.

4. The method of claim 3 further comprising interleaving the plurality of first and second transmission plates and positioning the first and second transmission plates with respect to the corresponding pluralities of first and second bars such that the emitted waves of the first plurality of wave emitters and the second plurality of wave emitters are interleaved in an output region comprising the output surfaces of the first and second transmission plates.

5. The method of claim 2 wherein the first bars and second bars are diode bars.

6. The method of claim 1 wherein the plurality of first waves have a first power density and wherein the second plurality of waves have a second power density and wherein reflecting at least one of the plurality of first and second waves generates a combined output wave at the output surfaces that has an output power density that is approximately a sum of the first power density and the second power density.

7. The method of claim 1 further comprising positioning the first and second transmission plates such that the output surfaces of the first transmission plates and the output surfaces of the second transmission plates are co-planar and adjacent.

8. The method of claim 1 further comprising positioning the first and second transmission plates such that output waves provided at the output surfaces of the first transmission plates and the output surfaces of the second transmission plates are output in a direction of propagation that is substantially normal to the output surfaces.

9. The method of claim 1 wherein the reflection discontinuity comprises an angled edge surface of the at least one of the first plurality of transmission plates and the second plurality of transmission plates.

10. The method of claim 9 further comprising treating the angled edge surface with a reflective coating.

11. The method of claim 10 further comprising configuring the reflective coating so that it is inwardly reflective, into the plate.

12. The method of claim 1 wherein the waves entering the first and second transmission plates undergo total internal reflection between the input surface and the output surface.

13. The method of claim 1 wherein both of the pluralities of first and second transmission plates include the reflection discontinuity.

14. The method of claim 1 wherein the first input plane and second input plane are coplanar.

15. The method of claim 1 wherein the first input plane and second input plane are parallel and spaced apart.

16. The method of claim 1 wherein the first input plane and second input plane are at an angle relative to each other.

17. The method of claim 1 wherein at least one of the first input plane and second input plane is at an angle relative to the output plane.

18. The method of claim 17, wherein the angle is 90°.

19. The method of claim 1 wherein at least one of the first input plane and second input plane is parallel to the output plane.

20. The method of claim 1 further comprising bonding the input surfaces of at least one of the plurality of the first and second transmission plates to a common input base plate.

21. The method of claim 1 further comprising bonding the output surfaces of the first and second transmission plates to a common output base plate.

22. The method of claim 1 wherein the first transmission plates each have a propagation length between the input surface and the output surface that is different from that of the second transmission plates.

23. The method of claim 1 wherein the pluralities of first and second waves comprise laser beams.

24. The method of claim 1 further comprising interleaving the first and second pluralities of transmission plates.

* * * * *